TRAVELING WAVE TUBE AMPLIFIER

Filed Dec. 6, 1954

INVENTOR
P. K. TIEN
BY Arthur J. Torsiglieri
ATTORNEY

United States Patent Office 2,921,224

Patented Jan. 12, 1960

2,921,224

TRAVELING WAVE TUBE AMPLIFIER

Ping K. Tien, Chatham Township, Morris County, N.J., assignor to Bell Telephone Laboratories, Incorporated, New York, N.Y., a corporation of New York Application December 6, 1954, Serial No. 473,287

18 Claims. (Cl. 315—3.6)

This invention relates to an amplifier of the traveling wave tube type.

A principal object of the present invention is to provide a high gain amplifier for microwave signal energy.

In a traveling wave tube, an electron beam is projected in coupling proximity with an electromagnetic wave propagating along a slow wave interaction circuit. Kinetic energy from the moving electrons in the beam is transferred to the electromagnetic wave, the amount of energy transferred to the wave being a function of the impedance of the slow wave interaction circuit. For maximum coupling, and therefore maximum gain to the wave, it is important to employ a slow wave circuit having a high impedance. However, it is characteristic that some circuits which have a high impedance for the fundamental component of a traveling wave also have a relatively high impedance for spatial harmonic components of a wave traveling therealong, particularly spatial harmonic components of the backward type. Moreover, it is also characteristic that a slow wave circuit which has a high impedance for spatial harmonic components of the backward type will normally oscillate in a backward wave mode when the beam current is increased beyond a certain point. This can be explained by the fact that operation in a backward wave mode is then regenerative; the electron beam provides positive feedback from regions of high energy level to regions of low energy level along the circuit. Because of this, with such circuits it has not been possible hitherto to use high beam currents and, consequently, high gain and high power levels could not be obtained. The principles of backward wave oscillations are more fully discussed in an article entitled "Analysis of the Backward-Wave Traveling Wave Tube" by H. Heffner which appears in the Proceedings of the Institute of Radio Engineers, vol. 42, No. 6, June 1954.

An important example of a slow wave interaction circuit which exhibits these characteristics, and therefore becomes unstable during high-gain operation or at high-power levels, is the bifilar helix. The term "bifilar helix" as used herein shall designate a structure composed of two interwound helices, the two helices having substantially equal diameters and pitches. It has been found heretofore that a bifilar helix slow wave structure has a higher impedance than an ordinary single wire helix and amplifiers utilizing this type of slow wave structure have been proposed for use in forward wave amplifiers. Moreover, such a circuit has the advantage that it readily adapts itself to electrostatic focusing. A discussion of the embodiment of this type of structure in a traveling wave tube amplifier can be found in United States Patents 2,801,361, issued July 30, 1957, and 2,843,792, issued July 15, 1958, of J. R. Pierce. However, in operation, it is found that the gain and power output that can be realized in such an amplifier are limited for the reasons discussed. As the beam current is increased in an endeavor to effect an increase in gain, the amplifier becomes unstable and oscillations occur. This problem has curtailed the use of bifilar helices in high-gain or high-power forward wave amplifiers.

A study of the characteristics of the bifilar slow wave circuit has shown that substantially all of the microwave energy propagating therealong at a phase velocity within the range which is of interest for interaction with an electron beam will be contained within two distinct modes. In one of these modes, commonly designated the out-of-phase mode, the currents flowing on the two helical wires are equal and out of phase at corresponding points in the wires in a plane cutting perpendicularly the bifilar helix axis, and, in the second mode, commonly designated the in-phase mode, the currents flowing on the two helical wires are equal and in phase at corresponding points in such a plane. Moreover, it has been determined that the in-phase mode is characterized by a high impedance, and is therefore an extremely desirable mode, for operation in a forward wave amplifier. The out-of-phase mode, however, is characterized by strong spatial harmonic components and therefore exhibits a strong tendency to oscillate in a backward wave mode. The presence of the out-of-phase mode on the bifilar helix, therefore, makes the amplifier highly unstable for high-gain operation or at high power levels since it is then apt to give rise to backward wave oscillations.

A more specific object, therefore, is to increase the power and gain that can be realized in a forward wave amplifier of the traveling wave tube type which utilizes a bifilar helix as a slow wave interaction circuit.

In accordance with the present invention, by selectively suppressing the propagation of the out-of-phase mode, without significantly affecting propagation of the in-phase mode, a stable high-gain amplifier can be realized. To this end, a feature of the present invention is the combination of a bifilar helix slow wave interaction circuit and a loading transmission structure closely coupled to the out-of-phase mode thereof, for suppressing propagation of this mode along the bifilar helix circuit. An advantage of this arrangement for suppressing the out-of-phase mode is that it is compatible with the use of the bifilar helix as a means for electrostatically focusing the electron beam, as explained in greater detail below.

In an illustrative embodiment of the present invention, a traveling wave tube including an electron gun and a target for defining therebetween a path of flow for an electron beam is equipped with a bifilar helix slow wave circuit. The bifilar helix, which is a plurality of operating wavelengths long, is positioned to surround the electron beam and extends longitudinally along a portion of the length of the tube for propagating microwave energy in coupling relation with the electron beam. Input and output coupling connectors are provided at opposite ends of the bifilar helix for coupling wave energy thereto. Additionally, a two-strip transmission line is positioned along the length of the bifilar helix in coupling proximity to the out-of-phase mode thereof, the two strips arranged in parallel on opposite sides of the bifilar helix.

The above and other features and objects of the invention will become apparent by referring to the following description which should be read in conjunction with the accompanying drawings, in which.

Figures 1, 1A, 2, 3A:
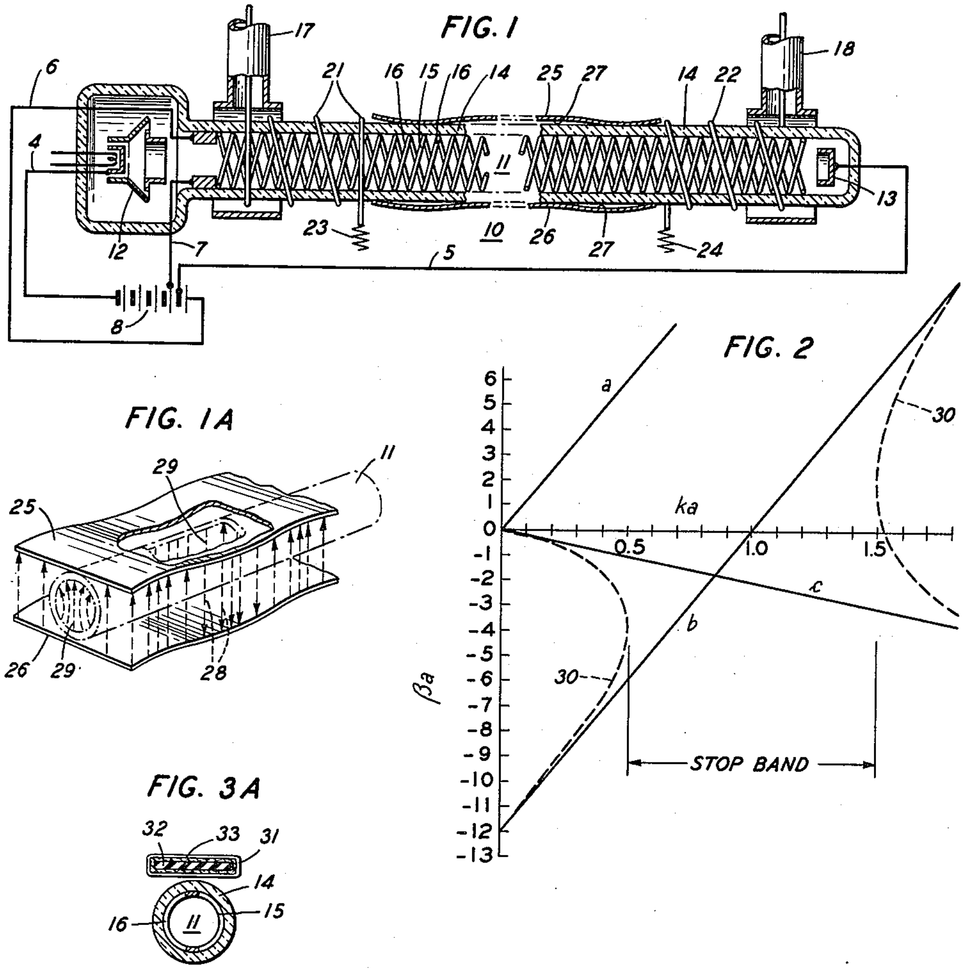
Fig. 1 shows an embodiment of the present invention in a traveling wave tube amplifier.
Fig. 1A shows a partially cut-away view of the two-strip transmission line, with a schematic representation of the bifilar helix, and the interacting fields associated with each.
Fig. 2 is a plot of the propagating characteristics of the various wave propagating components of the amplifier.
Fig. 3A is a cross-sectional view of the tube of Fig. 3 taken through line 3A—3A.

Referring now more particularly to the drawings, Fig. 1 shows, by way of example, a traveling wave tube 10 which utilizes a bifilar helix 11 as the slow wave interaction circuit. In this tube, electron gun 12 and target 13 are positioned at opposite ends of an evacuated envelope 14 and maintained at suitable operating voltages by lead-in conductors 4 and 5, respectively, for establishing a solid electron beam of circular cross section along the length of the envelope between these electrodes. The electron gun and the various electrical connections are shown schematically for purposes of simplification. Bifilar helix 11, composed of two separate interwound helices 15 and 16, is positioned to surround the electron path for propagating an electromagnetic wave in coupling proximity to the electron flow and is maintained at a suitable average potential for accelerating the electron beam to a velocity substantially equal to the axial velocity of the in-phase mode of the signal wave traveling along the bifilar helix. Focusing of the electron beam passing axially within the bifilar helix may be obtained by maintaining conductor 15 at a suitable voltage below the average accelerating voltage and conductor 16 the same amount above the average voltage. In Fig. 1 the source of voltage is shown as a battery 8 and lead-in conductors 6 and 7 serve to maintain the helical conductors 15 and 16, respectively, at their proper voltages. A spatially alternating electrostatic field is thereby set up along the path of flow by the bifilar helix. This field, which is constant with time but spatially alternating, will effectively focus an electron beam passing within the bifilar helix. This technique is disclosed in detail in my United States Patent 2,843,776, issued July 15, 1958. Alternatively, magnetic focusing may be employed for focusing the electron beam, as is well known in the art.

Transducers in the form of coupled helices, by way of example, are provided for intercoupling between the external coaxial lines 17 and 18 and bifilar helix 11. The general principles of coupled helix transducers of this kind are described in United States Patent 2,811,673, issued October 29, 1957, of R. Kompfner. In operation as a forward wave amplifier coaxial line 17 serves at the input terminal and the wave energy propagating therealong is coupled to bifilar helix 11 via the single conductor helix 21. The wave energy is amplified in passing along the helical slow wave circuit in the direction of electron flow by the now well known process of energy interchange between the electrons in motion and the electromagnetic field. The amplified wave is then coupled from the helical slow wave circuit 11 to the single conductor helix 22 and passes along coaxial line 18 to utilization means. The coupling helices 21 and 22 are preferably terminated in impedances 23 and 24, respectively, for minimizing reflections at the end of the coupling helix away from the coaxial connectors. It is important also to maintain the bifilar helix circuit sufficiently lossy to attenuate wave energy reflected back from the output toward the input by any impedance mismatch between the bifilar helix 11 and the single conductor helix 22. The mismatch, however, can be minimized by careful design as explained in the above-mentioned Kompfner patent.

As explained in the above-mentioned patent of R. Kompfner, the amount of coupling between input and ontput coupling helices 21 and 22 and bifilar helix 11 depends on the winding sense of each. By winding the coupling helices in a direction opposite to that of helix 11, as shown in Fig. 1, the amount of coupling therebetween can be maximized. Moreover, each of the coupling helices should have a pitch such that the axial phase velocity of a wave propagating therealong in the absence of the bifilar helix would be substantially the same as the axial phase velocity of the in-phase mode of the wave on the bifilar helix in the absence of the coupling helix. Other design considerations for obtaining broad band operation and other desired operating characteristics are set forth in the above-mentioned patent of R. Kompfner.

As discussed above, in the operation of a traveling wave tube as a forward wave amplifier, it has been found that the inclusion of a bifilar helix as a slow wave interaction circuit introduces problems which tend to limit the operating level of the amplifier. The presence of an out-of-phase mode, which gives rise to regenerative feedback when the beam current is sufficiently high, results in backward wave oscillations. Moreover, excitation of this out-of-phase mode is independent of the manner in which the input signal is applied to the bifilar helix. Since the electron beam is inherently inhomogeneous, it includes noise components over essentially the whole frequency spectrum which is capable of propagating along the bifilar helix. As a result, the bifilar helix normally will have induced thereon wave components which tend to propagate therealong in the out-of-phase mode and give rise to oscillation at high levels of beam current. By suppressing this out-of-phase mode, however, in a manner which little affects the in-phase mode, stable amplifier operation with high values of beam current, with consequent high gains and power levels, can be obtained.

For an understanding of the operation of the present invention, it will be helpful to keep in mind the two conditions necessary for close coupling between two transmission lines. The first condition is that the field pattern of a wave passing along each of the lines be substantially the same, and the second is that the phase velocity of the two lines when not affected by any coupling between the two be approximately equal. Moreover, it is important also to keep in mind that the resulting propagation characteristics of two transmission lines when closely coupled are substantially different than the propagating characteristics of either of the lines uncoupled. It is this phenomenon which is utilized to change sufficiently the propagating characteristics for the out-of-phase mode that a region of infinite attenuation or zero transmission can be obtained. This will be illustrated hereinafter with reference to Fig. 2.

In accordance with an illustrative embodiment of the present invention a two-conductor loading transmission line 25, 26, is positioned along a portion of the length of the bifilar helix of Fig. 1. This transmission line may be undulated as shown, in order to secure a desired axial phase velocity therealong. By a proper choice of the axial phase velocity of the loading transmission line, the bifilar helix dimensions and the beam accelerating potential, there is effected a strong coupling between the loading transmission line and the out-of-phase mode on the bifilar helix. This coupling results in the suppression of the out-of-phase mode and stable forward wave amplifier operation.

A sketch of the field pattern 28 along the two conductor loading transmission line and the field pattern 29 of the out-of-phase mode along the bifilar helix is shown in Fig. 1A. In this figure the bifilar helix 11 is shown schematically positioned within the two conductor line 25, 26. A portion of conductor 25 is cut away to show the field pattern of the out-of-phase mode along the helix. It can be seen that the field pattern of the out-of-phase mode on the helix, shown by the broken lines 29, is substantially the same as that of a wave passing along the two conductor line. It will be appreciated by a worker in the art that the field pattern of the in-phase mode on the helix is substantially different than the field pattern along the loading transmission line.

The second condition is that the phase velocity of the out-of-phase mode on the bifilar helix, when not in the presence of the loading transmission line, be approximately equal to the phase velocity of the transmission line when not in the presence of the helix. It will be convenient to refer to the phase velocity of each of these components when unaffected by external coupling as its characteristic phase velocity. A better understanding of the effect of this condition can be obtained by reference to the graph of Fig. 2. In this graph the three curves $a$, $b$, and $c$ represent the propagating characteristics of the in-phase mode, the out-of-phase mode, and the loading transmission line, respectively plotted against a measure of frequency. It is convenient to plot $\beta a$ against $ka$ where $\beta$ is the propagation constant, $a$ is the helix radius and $k$ is given by the expression $$\frac{2\pi f}{c}$$

($c$ being the speed of light in free space), and so is a quantity proportional to frequency. The ratio of the coordinates at any point on each of the curves is a measure of the ratio of the velocity of light to the characteristic phase velocity of the corresponding component wave for that value of $ka$. It can be seen that the characteristic phase velocity associated with the in-phase mode is appreciably different from the characteristic phase velocity associated with the loading transmission line, but both being substantially constant with changes in frequency. Because of this and also since they have different field patterns, there will be an insignificant amount of coupling betwen these modes. It can be noted, however, that the characteristic phase velocity associated with the out-of-phase mode is not constant, but varies with frequency and equals the characteristic phase velocity of the loading transmission line at the intersection of curves $b$ and $c$. In the region of intersection the second condition necessary for the close coupling is fulfilled and a strong coupling between the out-of-phase mode and the loading transmission line will result. For reasons explained above, in this region of close coupling the propagating characteristics can no longer be described by the individual curves $b$ and $c$ which represent the networks uncoupled but are now shown by the broken line curve 30 of Fig. 2. It will be seen that this curve 30 representing the propagating characteristics for the out-of-phase mode along the two lines coupled together, is composed of two segments, one segment of the curve for frequencies above and the other for frequencies below the region of equal phase velocity of the loading transmission line and the out-of-phase mode of the bifilar helix. The frequency band between these two broken line segments may be described as a region of zero transmission or infinite attenuation of the out-of-phase mode. This frequency region of no propagation for the out-of-phase mode, which results as a consequence of the presence of the two-strip transmission line, shall be designated a stop band for the out-of-phase mode.

However, the effective region of suppression for out-of-phase mode actually extends outside of the stop band, but the attenuation outside of this stop band is considerably less. It has been found, however, that the attenuation outside of the top band can be increased, thereby extending the frequency region of high attenuation, by inserting lossy material on the loading transmission line. In Fig. 1 a cloth 27 of lossy material such as Aquadag is inserted along the loading transmission strips 25 and 26 for extending the frequency range of high attenuation for the out-of-phase mode outside the region of the stop band shown in Fig. 2.

The significance of maximizing the range of frequencies over which high attenuation of the out-of-phase mode extends can be explained in the following manner. It is well known by those skilled in the art that in a backward wave oscillator the frequency of oscillation is dependent upon the voltage applied to accelerate the electron beam. When the accelerating voltage is changed the frequency of oscillation will change. However, in the present device, as long as the theoretical frequency of oscillation falls within the region of high attenuation for the out-of-phase mode, oscillation will be impeded. It follows, therefore, that for a high attenuation region extending over a very wide frequency range considerable changes may be made in the beam accelerating voltage of the amplifier without resulting in backward wave oscillation of the out-of-phase mode. This wide choice in the selection of the accelerating voltage is useful both in design and operation of forward wave amplifiers.

In the design of a forward wave amplifier utilizing an interaction circuit which is characterized by high impedance for both forward and backward wave modes, such as the bifilar helix, the same procedure is followed as in the design of the usual type of forward wave amplifier. As is well known in the art, the helix geometry and beam accelerating voltage in such an amplifier voltage are chosen in order to achieve desired operating characteristics, such as operating frequency and bandwidth. Furthermore, it is characteristic of the present amplifier that the choice of these parameters is advantageously made so that the desired frequency for amplification lies within the stop band for the backward wave mode. However, this restriction in the choice of design parameters can be circumvented to a large extent by extending the range of high attenuation for the backward wave mode over a wider range of frequency. As explained above, this can be accomplished by inserting lossy material on the loading transmission line. So, after choosing the design parameters to obtain the desired amplifier operating characteristics, if the desired frequency for amplification falls outside of the frequency range of the stop band, lossy material may be inserted along the loading line in order to extend the range of high attenuation for the backward wave mode, thereby effectively suppressing oscillation.

The extremely wide frequency range over which the present amplifier can operate is indicated by the curves of Fig. 2. In this figure it should be noted that the stop band for the out-of-phase mode, which represents the region of stable amplifier operation even before lossy material is introduced along the loading transmission line, extends to the value of $ka$ equal to 1.5. $ka$ is the ratio of the helix circumference to the free-space wavelength, a quantity directly proportional to frequency. In comparison, it is noted that the usual slow wave circuit such as the single wire helix, in the absence of a loading transmission line which characterizes the present invention, has an operating range which extends only to the value of $ka$ equal to 0.3. This means that for a given helix circumference the present amplifier will have stable operation at a frequency five times higher than usual amplifiers. Alternately, for a given operating frequency the present amplifier can use a helix whose circumference is five times as large as the circumference of single wire helices in amplifiers proposed heretofore. This obviously will extend the useful range of forward wave amplifiers to bandwidths which have heretofore been unobtainable. Moreover, such large circumference helices will be especially useful at high power operation where large beam currents are important.

Figure 3:
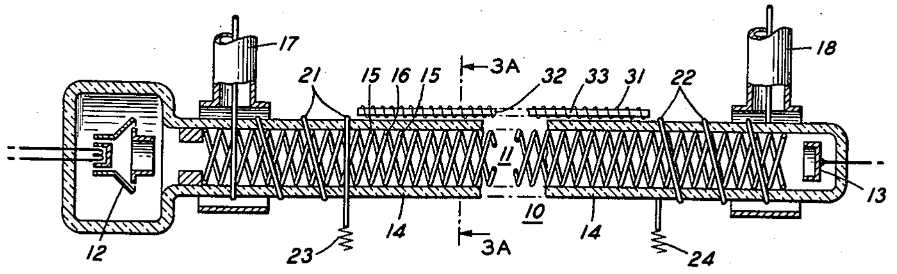
Fig. 3 shows a modified form of the present invention embodied in a traveling wave tube amplifier.

Fig. 3 shows an alternative modification of the present invention. Elements of this figure corresponding to elements of Fig. 1 are designated by the same reference numerals. The two conductor transmission line of Fig. 1 is replaced by a single wire helix which, by way of example, is shown wound on a flat strip of dielectric material. In accordance with the present invention the flat helix 31 is positioned adjacent the tube envelope 14 in coupling proximity to the bifilar helix 11 and serves as a loading transmission line. It can be shown that the electric field pattern associated with the flat helix is substantially the same as that of the out-of-phase mode of the bifilar helix. This fulfills the first of the conditions necessary for strong coupling which are set forth above. Moreover, by adjusting the pitch of the flat helix so that its characteristic phase velocity is approximately equal to the characteristic phase velocity of the out-of-phase mode along the bifilar helix, the second condition essential to strong coupling will be satisfied. By positioning a flat helix having such a pitch in coupling proximity to bifilar helix 11 the energy propagated in the out-of-phase mode along helix 11 will be suppressed and a stop band thereby produced, as explained above with reference to Fig. 2. Also, as explained with reference to Fig. 1, the region of high attenuation may be extended outside of the region of the stop band by making the external loading transmission line lossy. This is done by coating the dielectric strip 32 with a lossy material 33 such as Aquadag.

A cross section of Fig. 3 taken through line 3A—3A is shown in Fig. 3A. This figure shows more clearly the wide dimension of the flat helix 31. This helix is wound on a flat strip of dielectric material 32 which is coated with a lossy material 33, and preferably positioned close to the bifilar helix 11, which is within envelope 14, to insure close coupling with the out-of-phase mode on the bifilar helix.

It is understood that the specific embodiments are merely illustrative of the general principles of the invention. Various other arrangements may be devised by one skilled in the art without departing from the spirit and scope of the invention. In particular, the basic principle of the invention, the loading of an interaction circuit which is susceptible to both forward and backward wave modes for suppression of the backward wave mode, may be extended to forms of interaction circuits other than the bifilar helix, such as a single wire helix circuit or a circuit comprising a pair of coaxial helices of different diameters and wound in opposite senses.

What is claimed is:

1. In a device which utilizes the interaction between electromagnetic wave energy and an electron beam, an envelope, an electron gun and target spaced apart in said envelope for defining a path of electron flow, and means for propagating electromagnetic wave energy in coupling proximity with said electron flow, said means comprising a slow wave circuit capable of propagating both forward and backward wave modes and a transmission line positioned in coupling relation selectively to the backward wave mode of said slow wave circuit for creating in said slow wave circuit a stop-band or region of no propagation for said backward wave mode.

2. In a device which utilizes the interaction between electromagnetic wave energy and an electron beam, an envelope, an electron gun and target spaced apart in said envelope for defining a path of electron flow, and means for propagating electromagnetic wave energy in coupling proximity with said electron flow, said means comprising a slow wave circuit capable of propagating both forward and backward wave modes and a two conductor transmission line extending along the length of the slow wave circuit for creating in said slow wave circuit a stop-band for said backward wave mode, the two conductors being undulated and arranged in parallel on opposite sides of said slow wave circuit.

3. In a device which utilizes the interaction between electromagnetic wave energy and an electron beam, an envelope, an electron gun and target spaced apart in said envelope for defining a path of electron flow, and means for propagating electromagnetic wave energy in coupling proximity with said electron flow, said means comprising a slow wave circuit capable of propagating forward and backward wave modes and wave guiding means including a single wire helix transmission line positioned adjacent said slow wave circuit in coupling relation selectively to the backward wave mode thereof for creating in the slow wave circuit over a wide frequency range a stop-band for the backward wave mode.

4. In a device which utilizes the interaction between electromagnetic wave energy and an electron beam, an envelope, an electron gun and target spaced apart in said envelope for defining a path of electron flow, means for propagating electromagnetic wave energy in coupling proximity with said electron flow, said means comprising a slow wave circuit capable of propagating forward and backward wave modes and wave guiding means including a flat single wire helix wound on a flat dielectric strip and positioned along the length of said slow wave circuit in coupling relation selectively to the backward wave mode thereof and a layer of lossy material on the surface of said dielectric strip for creating in the slow wave circuit over a wide frequency range a stop-band for the backward wave mode.

5. In a device which utilizes the interaction between electromagnetic wave energy and an electron beam, an envelope, an electron gun and target spaced apart in said envelope for defining a path of electron flow, means for propagating electromagnetic wave energy in coupling proximity with said electron flow, said means comprising a bifilar slow wave circuit characterized by a tendency to propagate electromagnetic wave energy in both the in-phase and out-of-phase modes and loading means coupled selectively to the out-of-phase modes of said bifilar circuit for creating in said circuit a stop-band for the out-of-phase mode.

6. In a device which utilizes the interaction between electromagnetic wave energy and an electron beam, an envelope, an electron gun and target spaced apart in said envelope for defining a path of electron flow, means for propagating electromagnetic wave energy in coupling proximity with said electron flow, said means comprising a bifilar helix slow wave circuit and a two-strip transmission line coupled selectively to the out-of-phase mode of said slow wave circuit for creating in said slow wave circuit a stop-band for the out-of-phase mode.

7. In a device which utilizes the interaction between electromagnetic wave energy and an electron beam, an envelope, an electron gun and target spaced apart in said envelope for defining a path of electron flow, means for propagating electromagnetic wave energy in coupling proximity with said electron flow, said means comprising a bifilar helix slow wave circuit and a single wire helix positioned along the length of said bifilar slow wave circuit in coupling relation selectively to the out-of-phase mode of said circuit for creating in said circuit a stop-band for said out-of-phase mode.

8. In a device which utilizes the interaction between electromagnetic wave energy and an electron beam, an envelope, an electron gun and target spaced apart in said envelope for defining a path of electron flow, means for propagating electromagnetic wave energy in coupling proximity with said electron flow, said means comprising a bifilar helix slow wave circuit and a two-strip transmission line extending along the length of said bifilar helix in coupling relation selectively to the out-of-phase mode thereof for creating in said bifilar helix a stop-band for said out-of-phase mode, the two strips arranged in parallel on opposite sides of said bifilar helix and a lossy material positioned contiguous to and along said two-strip line.

9. In a device which utilizes the interaction between electromagnetic wave energy and an electron beam, an envelope, an electron gun and target spaced apart in said envelope for defining a path of electron flow, means for propagating electromagnetic wave energy in coupling proximity with said electron flow, said means comprising a bifilar helix positioned to surround the path of electron flow, and wave guiding means coupled selectively to the out-of-phase mode of said bifiler helix for creating in the bifilar helix a stop-band for said out-of-phase mode; and means including a voltage source for maintaining the two interwound conductors of the bifilar helix at different potentials for establishing a spatially alternating electrostatic focusing field along the path of electron flow.

10. In combination, an evacuated envelope, two electrodes spaced apart in said evacuated envelope for forming a path of electron flow, and means for propagating electromagnetic wave energy in coupling relation with said electron flow, said means comprising a slow wave circuit having a tendency to propagate energy in the forward and backward wave modes and a loading transmission line adjacent said circuit in coupling relation selectively to the backward wave mode of said circuit for creating in said circuit a stop-band for the backward wave mode.

11. A traveling wave tube comprising an electron gun for forming an electron beam, a bifilar helix for propagating electromagnetic wave energy in coupling proximity to said beam, and a two conductor transmission line positioned adjacent the bifilar helix for creating in the bifilar helix a stop-band for the out-of-phase mode of said bifilar helix.

12. In a traveling wave tube comprising an electron gun and a target spaced apart in said tube for forming an electron beam, a bifilar helix positioned to surround said electron beam, means including a voltage source for maintaining the two conductors of said bifilar helix at different potentials for focusing said electron beam, and a loading transmission line positioned along the bifilar helix and coupled selectively to the out-of-phase mode of said bifilar helix for creating in the bifilar helix a stop-band for said out-of-phase mode.

13. In a traveling wave tube comprising an electron gun and a target spaced apart in said tube for forming an electron beam, a bifilar helix positioned to surround said electron beam, means including a voltage source for maintaining the two conductors of said bifilar helix at different potentials for focusing said electron beam, and a flat single-wire helix positioned along the length of the bifilar helix for creating a stop-band for the out-of-phase mode of said bifilar helix, the characteristic phase velocity of the single-wire helix being approximately equal to the characteristic phase velocity of the out-of-phase mode in the bifilar helix.

14. In a traveling wave tube comprising an electron gun and target spaced apart in said tube for forming an electron beam, a bifilar helix positioned to surround said electron beam, means including a voltage source for maintaining the two conductors of said bifilar helix at different potentials for focusing said electron beam, and a two-conductor transmission line positioned along the length of the bifilar helix for creating in the bifilar helix a stop-band for its backward wave mode, the two conductors being undulated and arranged in parallel on opposite sides of said bifilar helix.

15. An amplifier which utilizes the interaction between electromagnetic wave energy and an electron beam comprising means including an electron source and target for defining a path of electron flow, a bifilar helix slow wave circuit positioned along the path of flow for propagating electromagnetic energy in coupling relation with said electron flow, an input connector positioned in coupling proximity to the bifilar helix at the source end of the electron path, an output connector positioned in coupling proximity to the bifilar helix at the target end of the electron path, and a two-strip transmission line positioned along the length of the bifilar helix in coupling proximity to the out-of-phase mode thereof for creating in said bifilar helix a stop-band for said out-of-phase mode, the two strips arranged in parallel on opposite sides of the bifilar helix.

16. A device which utilizes the interaction between electromagnetic wave energy and an electron beam, comprising means forming an electron beam, and circuit means for propagating microwave energy in coupling proximity with said electron beam, said circuit means comprising a slow wave circuit characterized by the ability to propagate both forward and backward wave modes and a loading transmission line adjacent said slow wave circuit in coupling relation selectively to the backward wave mode thereof, for creating in said slow wave circuit a stop-band for said backward wave mode the characteristic phase velocity and field pattern along the loading transmission line being approximately the same as the characteristic phase velocity and field pattern of the backward wave mode along the slow wave circuit but different from that of the forward wave mode along said slow wave circuit.

17. A device which utilizes the interaction between electromagnetic wave energy and an electron beam comprising an evacuated envelope, two electrodes spaced apart in said envelope for defining a path of electron flow and circuit means for propagating high frequency energy in coupling relation with said electron flow, said circuit means comprising a bifilar helix slow wave circuit and a loading transmission line adjacent to said bifilar helix slow wave circuit for creating in said slow wave circuit a stop-band for its backward wave mode, the characteristic phase velocity and field pattern along the transmission line being approximately the same as the characteristic phase velocity and field pattern of the backward wave mode along said bifilar slow wave circuit.

18. In a traveling wave tube, an electron source providing an electron beam, a wave transmission circuit, a plurality of operating wavelengths long positioned in field coupling relation with the beam, said circuit having a tendency to propagate in a plurality of modes, an input connector coupled to the electron source end of the circuit, an output connector coupled to the opposite end of the circuit, and means for creating in said circuit a stop-band for the undesirable propagating modes in the circuit comprising a transmission line extending adjacent to the circuit in coupling relation with said undesirable propagating modes.

References Cited in the file of this patent

UNITED STATES PATENTS

| | | |
|---|---|---|
| 2,512,468 | Percival | June 20, 1950 |
| 2,654,047 | Clavier, et al. | Sept. 29, 1953 |
| 2,725,499 | Field | Nov. 29, 1955 |
| 2,751,561 | King | June 19, 1956 |
| 2,773,213 | Dodds | Dec. 4, 1956 |
| 2,809,321 | Johnson et al. | Oct. 8, 1957 |
| 2,811,673 | Kompfner | Oct. 29, 1957 |
| 2,846,613 | Pierce | Aug. 5, 1958 |

FOREIGN PATENTS

| | | |
|---|---|---|
| 993,156 | France | July 18, 1951 |
| 1,053,556 | France | Sept. 30, 1953 |